United States Patent Office 3,248,249
Patented Apr. 26, 1966

3,248,249
INORGANIC COATING AND BONDING
COMPOSITION
Glenn A. Collins, Jr., North Wales, Pa., assignor to Teleflex Incorporated, North Wales, Pa., a corporation of Delaware
No Drawing. Filed June 28, 1963, Ser. No. 291,268
6 Claims. (Cl. 106—286)

This invention relates to a high heat and corrosion resistant coating composition and constitutes an improvement in the coating composition covered by concurrently filed United States patent applications Serial Nos. 291,269; 291,271; 291,289 and 291,248 which are continuations-in-part of United States patent applications Serial Nos. 166,385, 166,386 and 166,398 all filed January 15, 1962, and all being assigned to the assignee of the present invention. Applications Serial Nos. 291,269; 166,385; 166,386; and 166,398 are now abandoned.

In the aforesaid patent applications there are disclosed coating compositions having high heat and corrosion resistance as well as other desirable properties and comprising a mixture of solid particulate material with a grain size less than 325 mesh in an aqueous solution containing substantial amounts of phosphate ion, metal ion and ions selected from the group consisting of chromate and molybdate. To form the coatings, such composition is applied as by spraying or dipping to the surface to be coated and is then dried and cured to water insolubility, such curing requiring temperatures upward of 500° F. and preferably from about 600° to 800° F.

I have now discovered that if all or a portion of the added solid particulate material is of colloidal grain size, on the order of one-tenth micron and finer, the curing temperature can be reduced to as low as about 250° F. without sacrifice in the quality of the final coating. In fact, by including a portion of such submicron grain size material, the resultant coatings are enhanced by a smoother finer textured surface. Briefly, then the compositions of the present inventions consist essentially of the uniform mixture of finely divided solid particulate material in an aqueous solution containing phosphate ion, metal ion and chromate or molybdate ion, at least a portion of said solid particulate material having a colloidal or submicron grain size, preferably less than about one-tenth micron. By far, the preferred such additions are colloidal sized alumina and silica which form gels. Further details as well as other advantages and features of the invention will appear more clearly from the following full description of various preferred embodiments thereof.

The phosphate anion concentration should preferably be from 1 to 4 mols per liter though as little as .5 per liter is satisfactory for some applications of the coatings. The phosphate can be introduced into the solution in the form of phosphoric acid, in the form of phosphates of the metal or metals to be included as the metal cation or, as is preferred, it can be added in both forms. It will be understood that the term "phosphate" is intended to comprehend not only the $PO_4$ ion but also the $HPO_4$ and $H_2PO_4$ ions. All three, for example, result from the ionization of $H_3PO_4$ and the hydrogen phosphate ions generally will, at least to some extent, be present in the compositions of this invention. Where phosphoric acid is used as additive in making the compositions, it is much desired to use the ortho acid $H_3PO_4$ though the invention also comprehends the use of the other forms such as the metal or pyro acids all ionizing in water to provide phosphate anion. Examples of metal phosphates which can be used to add phosphate ion are the mono, di and tribasic phosphates of magnesium, zinc, aluminum, iron and lithium. The phosphate used should, of course, be soluble in the solution though this does not mean it must be highly water soluble since many of the phosphates not soluble in water are nevertheless soluble in an acid solution, for example, one containing phosphoric acid or chromic acid. In general, however, the mono and dibasic phosphates, which are more soluble than the tribasic salts, are preferred. The chromate ion concentrate should be from about .3 to 3 mols per liter, at least .5 mol per liter being preferred. The chromate can be added as chromic acid, or as a metal chromate or dichromate, for example, the chromate or dichromate of magnesium, zinc, aluminum, calcium, barium, lithium, sodium or silver. If it is desired to replace the chromate ion in whole or in part with molybdate ion, molybdic acid or the metal molybdates, for example, zinc molybdate can be used. It will be manifest that the ion concentrations herein set forth include all of the dissolved material to which reference is made, whether existing in associated or disassociated form. Chromate ion is, however, preferred.

It will be manifest that the chromate may be present in the solution at least in part as the dichromate ion and hence the term "chromate" ion is intended to comprehend both chromate and dichromate; however, for purposes of uniformity and simplicity in defining concentration all the chromate is assumed to be present as chromate rather than dichromate though in fact it may be present as the latter.

The metal ion concentration should be from about .2 to 4 mols per liter and for most uses at least about 1 mol per liter. Where the phosphate and/or chromate or molybdate ion is furnished to the solution by addition of a metal salt, in accordance with the above, this inherently also supplies metal ion to the solution, hence, any of the aforementioned phosphates, chromates, dichromates or molybdates can be used as the source of metal ion. Additionally, metal ion can be supplied in the form such as metal oxide, hydroxide, carbonate, etc. which will dissolve in acid to produce the metal phosphate, chromate, or molybdate and therefore the metal ion, plus water and/or gas which is evolved. Of course, if the metal ion is added in this form the other solution additions must supply the acidity required to accomplish the acid-base reaction. For example, some of the phosphate ion should be added as phosphoric acid, as is preferred, or some of the chromate as chromic acid. The following metal compounds will illustrate those which can be added to generate the metal ion within the solution in accordance with the above: Magnesium oxide, magnesium hydroxide, zinc hydroxide, aluminum hydroxide, lithium oxide, lithium carbonate, calcium hydroxide, calcium carbonate. Of course, it will be understood that the insoluble refractory metal oxides for example alumina, which can be used as the solid particulate material in the practice of this invention as hereinafter described, cannot be employed as the metal ion additive since they are difficult if not impossible to dissolve even in the strong acid.

In general, the valence +2 and +3 metals are preferred. Magnesium is outstanding though for some specific uses of the compositions, the ferric and aluminum ions which are +3 valence, will serve to advantage. While not as good as magnesium, zinc is also desirable. The valence +1 metals are satisfactory though for most applications of the coatings it is generally preferable to use them only in combination with valence +2 and/or valence +3 metals.

The solid particulate material should, of course, be insoluble in the solution and hence form a slurry therewith. It can be included in an amount of from 10 to 2000 grams per liter though for most uses from about 300 to 1000 grams per liter will be preferred. Examples of solid particulate materials are the metal powders, such as powdered aluminum, nickel and silver, aluminum being outstandingly advantageous, the refractory oxides, carbides, nitrides, borides and silicides such as aluminum oxide, zirconium oxide, silicon carbide, silicon nitride, boron nitride, tungsten boride, molybdenum disilicide. For lubricative compositions, the solid particulate material will be a dry lubricant such as molybdenum disulfide, tungsten disulfide, graphite or lead oxide. Other particulate materials which can be used are silicates, such as magnesium silicate and zirconium silicate, calcium fluoride, cadmium fluoride and silica.

To attain a coating with exceptionally good lubricity and flexibility, the organic polymers of high inherent lubricity can be included in place of or in addition to the solid particulate material as described in detail and covered by copending United States patent application Serial No. 291,298 filed concurrently herewith.

In accordance with the present invention, there is added to the solution or slurry a material which has a submicron or colloidal grain size, generally less than one-tenth micron. Outstandingly superior are the superfine or colloidal alumina powders and silica powders, the latter being commonly known as silica aerogel and both of which form colloidal hydrous suspensions or gels with water. Because of their extremely fine particle size, these materials have very little weight per unit volume and as little as one gram per liter of solution provides a marked effect in reducing the temperature required to obtain a fully cured coating and in providing improvement in the physical characteristics of the coating, particularly texture. In general, amounts in excess of 100 grams per liter are never required to obtain optimum desirable effect. Depending upon the amount of such colloidal material and other solid particulate material added, the composition will have a consistency of from a fluid liquid to one of paste-like consistency. Compositions formulated in accordance with the invention can be cured at temperatures as low as 250° F. though the preferred curing temperature is from 300° F. to 500° F., a complete curing being attainable at such temperature in from 3 to 60 minutes, the precise time and temperature required will of course, depend upon the exact formulation of the coating.

The following specific examples will serve to further illustrate:

Example 1

| | |
|---|---|
| $H_3PO_4$ (85% aqueous solution) cc. | 200 |
| MgO grams | 50 |
| $Mg(H_2PO_4)_2 \cdot 3H_2O$ do | 50 |
| $MgCr_2O_7 \cdot 6H_2O$ do | 150 |
| Silica aerogel powder (less than .1 micron) do | 10 |
| Water, to 1000 cc. | |

This composition was sprayed on a steel panel, dried and then fully cured at 300° F. for 15 minutes.

Example 2

| | Grams |
|---|---|
| $CrO_3$ | 92 |
| $H_3PO_4$ | 98 |
| $Mg(H_2PO_4)_2 \cdot 3H_2O$ | 272 |
| Silica aerogel powder (less than .1 micron) | 5 |
| Aluminum powder (spherical, 5–10 micron) | 600 |
| Water, to 1000 cc. | |

The composition coated on a steel panel fully cured at 300° F. for 30 minutes.

Example 3

| | Grams |
|---|---|
| $MgCr_2O_7 \cdot 6H_2O$ | 174 |
| $Na_2Cr_2O_7 \cdot 2H_2O$ | 75 |
| MgO | 40 |
| $H_3PO_4$ | 196 |
| Silica aerogel powder (less than .1 micron) | 8 |
| Silica (325 mesh) | 800 |
| Water, to 1000 cc. | |

The composition was coated on a steel panel fully cured at 300° F. for 30 minutes.

Example 4

| | Grams |
|---|---|
| $CaCr_2O_7 \cdot 3H_2O$ | 310 |
| $H_3PO_4$ | 294 |
| Alumina gel powder (less than .1 micron) | 20 |
| Aluminum powder (5–10 micron) | 800 |
| Water, to 1000 cc. | |

The composition was coated on a steel plate and fully cured at 400° F. for 8 minutes.

Example 5

| | |
|---|---|
| $H_3PO_4$ (85% aqueous solution) cc. | 200 |
| $MgCr_2O_7 \cdot 6H_2O$ grams | 160 |
| MgO do | 50 |
| $Mg(H_2PO_4)_2 \cdot 3H_2O$ do | 50 |
| Alumina gel powder (less than .1 micron) do | 30 |
| Molydenum disulfide (65 micron and less) do | 100 |
| Water, to 1000 cc. | |

Cured at 450° F. for 6 minutes.

All the coatings obtained in accordance with the above examples had excellent adhesion, heat and abrasion resistance etc., and an excellent smooth texture.

Examples of other submicron or colloidal grain size gel formers are the hydrous oxides of iron and chromium, and bentonite, all of which form gelatinous suspensions in water. Hence, it will be understood that while the invention has been described in its details specifically with reference to preferred embodiments thereof, changes and modifications can be made all within the full and intended scope of the claims which follow.

I claim:

1. A coating and bonding composition consisting essentially of a dispersion of inorganic solid particulate material having a grain size less than 325 mesh dispersed in an aqueous solution the solute of which consists essentially of a combination of inorganic compounds from the group consisting of phosphoric acid, chromic acid, molybdic acid and the metal salts of said acids, the combination of compounds in said solution being such as will provide at least about .5 mol per liter dissolved phosphate, at least .3 mol per liter dissolved material from the group consisting of chromate and molybdate, and at least .2 mol per liter dissolved metal, said solid particulate material being substantially insoluble in said solution and being present in an amount of from about 10 to 2000 grams per liter of said solution, from about 1 to 100 grams per liter of said solid particulate material being a submicron grain size gel-forming material which forms a hydrous colloidal gel with said solution, said composition being heat curable upon drying thereof to a substantially water insoluble material with all of said particulate material being bonded therein.

2. A composition as set forth in claim 1 wherein at least a portion of said submicron grain size material is gel-forming silica.

3. A composition as set forth in claim 1 wherein at least a portion of said submicron grain size material is gel-forming alumina.

4. A composition as set forth in claim 1 wherein the combination of compounds in said solution is such as will provide a dissolved phosphate concentration of about 1 to 4 mols per liter, a dissolved chromate concentration of about .5 to 3 mols per liter and a dissolved metal concentration of about 1 to 4 mols per liter.

5. A composition as set forth in claim 1 wherein the dissolved metal is predominantly magnesium.

6. A composition as set forth in claim 1 wherein a portion of said solid particulate material is metal powder.

References Cited by the Examiner

UNITED STATES PATENTS

| | | | |
|---|---|---|---|
| 1,069,903 | 8/1913 | Rupert | 106—14 |
| 1,291,352 | 1/1919 | Allen | 106—14 |
| 1,947,122 | 2/1934 | Burdick et al. | 106—14 |
| 2,357,269 | 8/1944 | Russell et al. | 106—38.9 |
| 2,702,425 | 2/1955 | Thompson | 106—14 |

ALEXANDER H. BRODMERKEL, *Primary Examiner.*

MORRIS LIEBMAN, *Examiner.*